(12) United States Patent
Aoki

(10) Patent No.: US 10,377,411 B2
(45) Date of Patent: Aug. 13, 2019

(54) STEERING CONTROL APPARATUS

(71) Applicant: DENSO CORPORATION, Kariya, Aichi-pref. (JP)

(72) Inventor: Takashi Aoki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 112 days.

(21) Appl. No.: 15/695,944

(22) Filed: Sep. 5, 2017

(65) Prior Publication Data

US 2018/0065658 A1    Mar. 8, 2018

(30) Foreign Application Priority Data

Sep. 7, 2016 (JP) .................. 2016-174508

(51) Int. Cl.
*B62D 5/04* (2006.01)
*B62D 6/00* (2006.01)

(52) U.S. Cl.
CPC ......... *B62D 5/0463* (2013.01); *B62D 5/0409* (2013.01); *B62D 5/0466* (2013.01); *B62D 6/008* (2013.01)

(58) Field of Classification Search
None
See application file for complete search history.

(56) References Cited

U.S. PATENT DOCUMENTS

| 2013/0060427 A1* | 3/2013 | Kataoka | B62D 5/0466 |
| | | | 701/42 |
| 2016/0001814 A1* | 1/2016 | Endo | B62D 5/0466 |
| | | | 701/41 |
| 2016/0347357 A1* | 12/2016 | Kitazume | B62D 5/0466 |
| 2017/0166246 A1* | 6/2017 | Gotou | B62D 5/0466 |
| 2018/0065658 A1* | 3/2018 | Aoki | B62D 5/0409 |
| 2018/0065659 A1 | 3/2018 | Aoki | |
| 2018/0065660 A1* | 3/2018 | Aoki | B62D 5/0409 |

FOREIGN PATENT DOCUMENTS

| JP | 4959212 | 6/2012 |
| JP | 4959217 | 6/2012 |
| JP | 2015-145216 A | 8/2015 |

* cited by examiner

*Primary Examiner* — Kevin Hurley
*Assistant Examiner* — Gabriela C Craciun
(74) *Attorney, Agent, or Firm* — Knobbe, Martens, Olson & Bear, LLP

(57) ABSTRACT

In a steering control apparatus, a basic assistance torque calculating unit calculates a basic assistance torque. A correction torque calculating unit calculates a correction torque to be added to the basic assistance torque. In the correction torque calculating unit, a returning state determining unit determines whether a steering wheel is turning or returning. A returning speed stabilization control unit calculates a returning speed stabilization torque to stabilize a returning speed of the steering wheel, as the correction torque. The returning speed stabilization control calculates the returning speed stabilization torque such as to bring a second-order time differential value of steering wheel position-related information correlated with a steering wheel position closer to zero, and such that an absolute value of the returning speed stabilization torque when the steering wheel is returning is relatively greater than that when the steering wheel is turning.

19 Claims, 14 Drawing Sheets

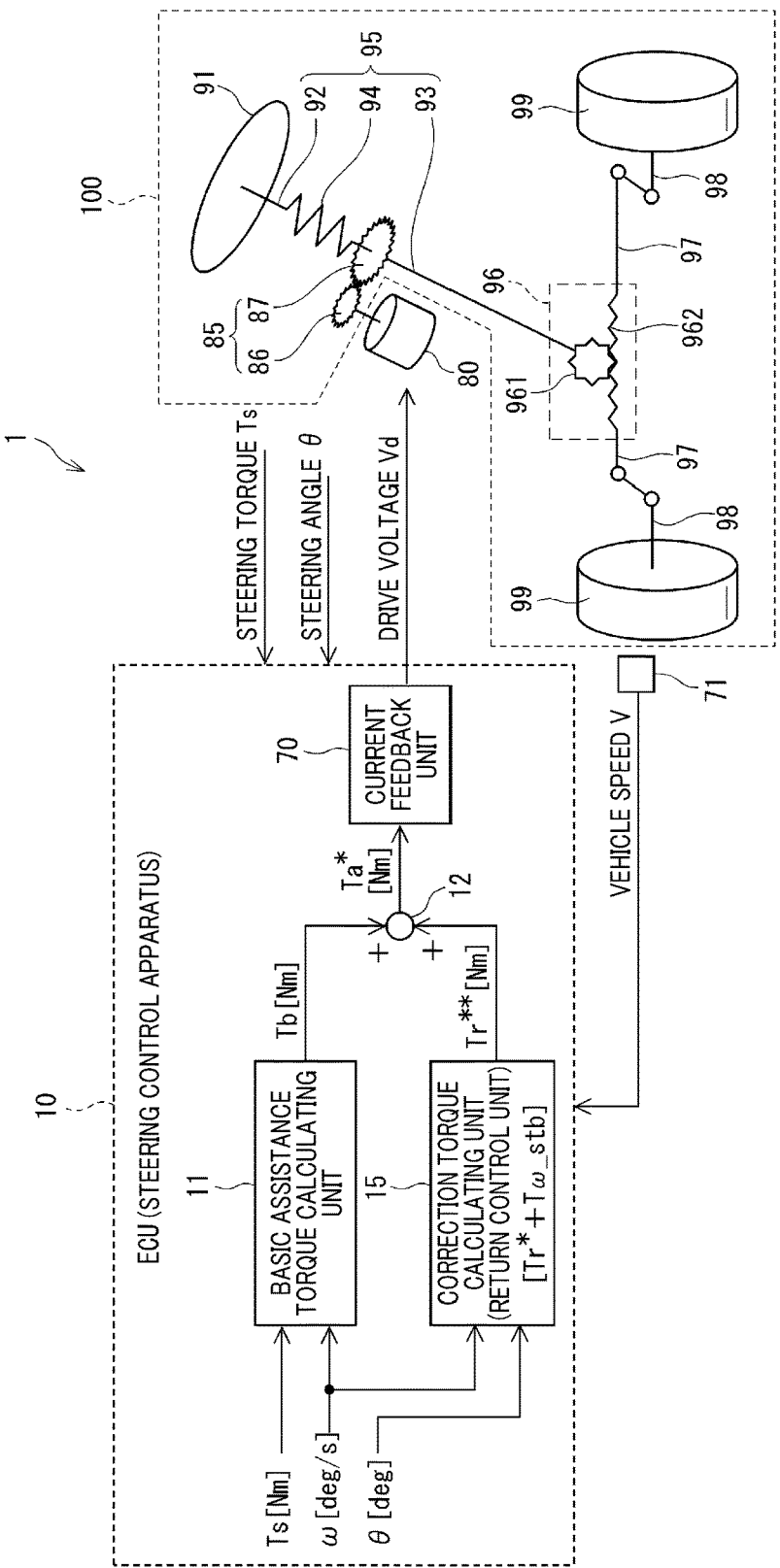

STEERING CONTROL APPARATUS

CROSS-REFERENCE TO RELATED APPLICATIONS

This application is based on and claims the benefit of priority from Japanese Patent Application No. 2016-174508, filed Sep. 7, 2016. The entire disclosure of the above application is incorporated herein by reference.

BACKGROUND

1. Technical Field

The present disclosure relates to a steering control apparatus.

2. Related Art

In a low vehicle-speed range, the sideslip angle of a vehicle body or a tire is relatively smaller than that when the vehicle speed is high. At the same steering angle and lateral acceleration, a self-aligning torque received from a road surface is smaller in the low-vehicle speed range. When the self-aligning torque becomes about equal to or less than friction in a steering mechanism, the steering wheel does not easily return to a neutral position. Consequently, a driver is required to intentionally perform an operation to return the steering wheel to the neutral position. Therefore, a steering control apparatus that performs "return control" is known. In the return control, a correction torque in a direction in which the steering wheel returns to the neutral position is calculated and added to an assistance torque.

For example, JP-A-2015-145216 discloses an apparatus in which a following problem is considered. That is, the steering wheel does not smoothly return to the neutral position during the return control, as a result of twisting of a torsion bar. Here, as a means for solving this problem, a counter-return command value in a direction in which the steering wheel does not return to the neutral position is calculated based on an angular acceleration of a motor. The counter-return command value is added to an assistance command value, and the steering wheel is thereby able to smoothly return to the neutral position.

In the technology in JP-A-2015-145216, the counter-return command value is calculated based on the angular acceleration of the motor, even during turning. Therefore, a problem arises in that a torque in a direction that inhibits steering is outputted when the driver performs turn steering.

SUMMARY

It is thus desired to provide a steering control apparatus that stabilizes a returning speed of a steering wheel.

An exemplary embodiment provides a steering control apparatus that controls an assistance torque outputted by a steering assistance motor based on a steering torque applied by a driver. The steering control apparatus includes a basic assistance torque calculating unit that calculates a basic assistance torque and a correction torque calculating unit that calculates a correction torque to be added to the basic assistance torque.

The correction torque calculating unit includes a returning state determining unit and a returning speed stabilization control unit. The returning state determining unit determines whether a steering wheel is turning or returning. The returning speed stabilization control unit calculates a returning speed stabilization torque to stabilize a returning speed of the steering wheel, as the correction torque. The returning speed stabilization control unit calculates the returning speed stabilization torque such as to bring a second-order time differential value of steering wheel position-related information correlated with a steering wheel position closer to 0, and such that an absolute value of the returning speed stabilization torque when the steering wheel is returning is relatively greater than that when the steering wheel is being turned.

The "second-order time differential value of steering wheel position-related information" is typically a steering angle acceleration. In addition, "bring a second-order time differential value of steering wheel position-related information . . . closer to 0" means control performed such that acceleration of the rotation of the steering wheel is suppressed and the returning speed is fixed. From a sensory perspective, this control corresponds to artificially increasing inertia in a steering system mechanism that is subject to control by the steering control apparatus. As a result, the present disclosure is capable of stabilizing the returning speed of the steering wheel and improving steering feel.

In addition, the returning speed stabilization torque is calculated such that the absolute value when the steering wheel is returning is relatively greater than that when the steering wheel is turning. In other words, the returning speed stabilization torque is not outputted when the steering wheel is being turned, compared to when the steering wheel is returning. The returning speed stabilization control unit preferably sets the returning speed stabilization torque to 0 when the steering wheel is turning.

As a result, during turn steering, acceleration of the rotation of the steering wheel as intended by the driver is permitted. Therefore, steering is not inhibited. Consequently, the returning speed of the steering wheel can be stabilized while preventing a problem, that is, "inhibition of steering when the driver performs turn steering" that is an issue in the conventional technology in JP-A-2015-145216.

Specifically, the returning state determining unit determines whether the steering wheel is in a returning state in which the steering wheel position is changing in a direction towards a neutral position or a turning state in which the steering wheel position is changing in a direction away from the neutral position.

In addition, the returning state determining unit preferably determines the returning state based on a return state quantity ($\alpha$) that is calculated from the steering wheel position-related information correlated with the steering wheel position and a time rate of change of the steering wheel position-related information. The returning speed stabilization control unit then changes the returning speed stabilization torque based on the return state quantity.

Furthermore, the correction torque calculating unit preferably further includes a return control amount calculating unit (30) that calculates a return control amount (Tr*) to assist in returning the steering wheel to the neutral position, as the correction torque. In this case, the correction torque calculating unit can calculate the return control amount based on at least either of a steering angle ($\theta$) and a steering speed ($\omega$).

BRIEF DESCRIPTION OF THE DRAWINGS

In the accompanying drawings:

FIG. 1 is an overall configuration diagram of an electric power steering system;

DESCRIPTION OF THE EMBODIMENTS

Figure 2A:
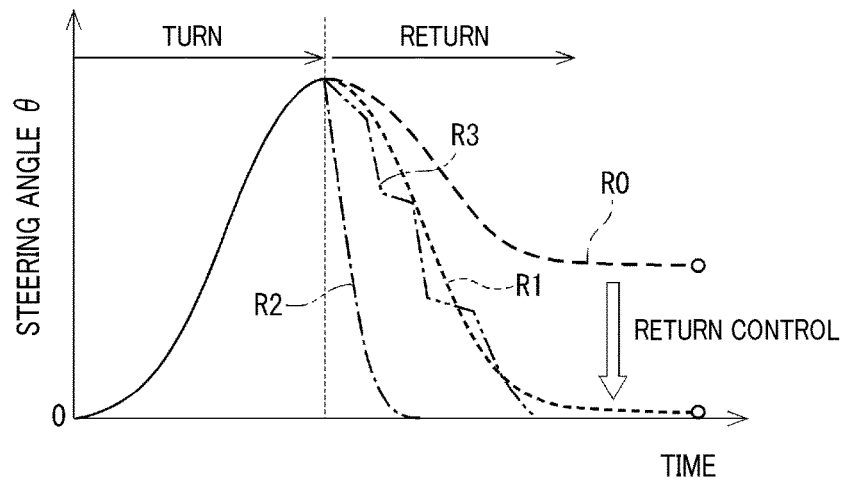
FIG. 2A is a diagram of changes over time in steering angle.

A plurality of embodiments of a steering control apparatus will hereinafter be described with reference to the drawings. According to each embodiment, an electronic control unit (ECU) serving as the "steering control apparatus" is applied to an electric power steering system of a vehicle. The ECU controls an assistance torque that is outputted from a steering assistance motor. In addition, in the specification, "present embodiment" collectively refers to first to third embodiments, described hereafter.

[Configuration of the Electric Power Steering System]

As shown in FIG. 1, an electric power steering system 1 assists a driver in operating a steering wheel 91 using torque from a steering assistance motor 80.

The steering wheel 91 is fixed to an end of a steering shaft 92. An intermediate shaft 93 is provided on the other end side of the steering shaft 92. A torque sensor 94 is provided between the steering shaft 92 and the intermediate shaft 93. An overall shaft from the steering shaft 92, through the torque sensor 94, to the intermediate shaft 93 is collectively referred to as a steering shaft section 95.

The torque sensor 94 detects a steering torque Ts that is applied to a torsion bar that connects the steering shaft 92 and the intermediate shaft 93, based on an angle of torsion of the torsion bar. A detection value of the torque sensor 94 is outputted to the ECU 10. A gear box 96 is provided in an end portion of the intermediate shaft 93 on the side opposite the torque sensor 94. The gear box 96 includes a pinion gear 961 and a rack 962.

When the steering wheel 91 is turned by the driver, the pinion gear 961 rotates together with the intermediate shaft 93. The rack 962 moves leftward or rightward in accompaniment with the rotation of the pinion gear 961. Tie rods 97 are provided on both ends of the rack 962. The tie rods 97 move leftward and rightward in a reciprocating manner, together with the rack 962. An orientation of a wheel 99 changes as a result of the tie rod 97 pulling and pushing a knuckle arm 98. In addition, a vehicle speed sensor 71 is provided in a predetermined section of the vehicle. The vehicle speed sensor 71 detects a vehicle speed V.

For example, the motor 80 is a three-phase brushless alternating-current motor. The motor 80 outputs an assistance torque based on a drive voltage Vd outputted from the ECU 10. The assistance torque assists with a steering force of the steering wheel 91. In the case of the three-phase alternating-current motor, the drive voltage Vd refers to a phase voltage of each phase, that is, a U phase, a V phase, and a W phase.

Rotation of the motor 80 is transmitted to the intermediate shaft 93 via a reduction mechanism 85. The reduction mechanism 85 has a worm gear 86 and a worm wheel 87. In addition, when the intermediate shaft 93 rotates as a result of a self-aligning torque or road-surface reaction force from the wheel 99 side, the rotation is transmitted to the motor 80 via the reduction mechanism 85.

The electric power steering system 1 shown in FIG. 1 is a column-assisted type in which the rotation of the motor 80 is transmitted to the steering shaft section 95. However, the ECU 10 according to the present embodiment can be similarly applied to a rack-assisted-type electric power steering system or a steer-by-wire system. In the steer-by-wire system, the steering wheel and steered wheels are mechanically separated.

In addition, according to another embodiment, a multiple-phase alternating-current motor that has a number of phases other than three, or a brushed direct-current motor may be used as the steering assistance motor. Here, an overall mechanism from the steering wheel 91 to the wheels 99 by which the steering force of the steering wheel 91 is transmitted is referred to as a "steering system mechanism 100."

The ECU 10 is operated by electric power received from an on-board battery (not shown). The ECU 10 calculates an assistance torque command Ta* based on the steering torque Ts detected by the torque sensor 94, the vehicle speed V detected by the vehicle speed sensor 71, and the like. Then, the ECU 10 applies the drive voltage Vd calculated based on the assistance torque command Ta* to the motor 80, thereby making the motor 80 generate the assistance torque. The various calculation processes performed by the ECU 10 may be software processes actualized by a central processing unit (CPU) running programs stored in advance in a tangible memory device, such as a read-only memory (ROM). Alternatively, the various calculation processes may be actualized by hardware processes performed by dedicated electronic circuits.

The ECU 10 includes a basic assistance torque calculating unit 11, a correction torque calculating unit 15, and a current feedback unit 70. The basic assistance torque calculating unit 11 calculates a basic assistance torque Tb based on the steering torque Ts and a steering speed ω. The correction torque calculating unit 15 calculates various types of correction torque to be added to the basic assistance torque Tb. The correction torque includes at least a returning speed stabilization torque Tω_stb.

According to the present embodiment, a configuration in which a return control amount final command value Tr is calculated as the correction torque is mainly presumed. The return control amount final command value Tr is obtained by a return control amount Tr* and the returning speed stabilization torque Tω_stb in the return control being added. Other types of correction torque will not be mentioned. Therefore, the "correction torque calculating unit" will specifically be described hereafter as a "return control unit 15."

The return control unit 15 calculates the return control amount final command value Tr based on the steering speed ω and a steering angle θ. An adder 12 adds the return control amount final command value Tr calculated by the return control unit 15 to the basic assistance torque Tb. The assistance torque command Ta* is thereby calculated.

Units, such as [Nm], [deg], and [deg/s], that are used regarding various quantities serve to express dimensions of these quantities and are not intended to limit usage thereto. For example, [rad] may be used as the unit for angles. A similar interpretation also applies to the drawings hereafter. Furthermore, the terms "steering angle θ" and "steering speed ω" are used not only for cases in which the steering wheel 91 is rotated through active steering by the driver, but also in an expansive manner to include the position and rotation speed of the steering wheel 91 in a state in which the driver has let go of the steering wheel 91.

The current feedback unit 70 performs feedback control of an actual current flowing to the motor 80 in relation to a target current based on the assistance torque command Ta*, and thereby calculates the drive voltage Vd applied to the motor 80. Configurations of the basic assistance torque calculating unit 11 and the current feedback unit 70 in the steering control apparatus are known technology. Therefore, detailed descriptions thereof are omitted.

[Overview of the Return Control]

Next, an overview of the return control will be described with reference to FIG. 2.

In a low vehicle-speed range, the sideslip angle of a vehicle body or a tire is relatively smaller than that when the vehicle speed is high. At the same steering angle and lateral acceleration, the self-aligning torque received from a road surface is smaller in the low-vehicle speed range. When the self-aligning torque becomes about equal to or less than the friction in the steering mechanism, the steering wheel does not easily return to the neutral position. Consequently, the driver is required to intentionally perform an operation to return the steering wheel to the neutral position.

Specifically, returning force is small in vehicles in which a toe angle and a caster trail are small, and in vehicles fitted with tires having low rolling resistance. In addition, friction is high in vehicles in which contact pressure against components is set to be high to reduce rattling noise of the rack and pinion mechanism. Each of the foregoing serves as a factor in inhibiting the return of the steering wheel to the neutral position.

Regarding such issues, the return control is control in which a correction torque in the direction in which the steering wheel returns to the neutral position is further added to the assistance torque in the electric power steering system.

Hereafter, in the present specification, a direction in which the steering wheel moves away from the neutral position is referred to as a "turning direction." The direction in which the steering wheel moves towards the neutral position is referred to as a "returning direction." That is, the "returning/turning direction" is objectively defined based on a relationship between the steering wheel and the neutral position, regardless of the senses of the driver.

Steering in the turning direction and steering in the returning direction are respectively referred to as "turn steering" and "return steering." In addition, a speed at which the steering wheel returns to the neutral position as a result of the self-aligning torque and the return control, even without the driver actively performing an operation to return the steering wheel, is referred to as a "returning speed."

FIG. 2A is a conceptual diagram showing changes over time in the steering angle θ until the steering wheel returns to the neutral position (that is, steering angle θ=0[deg]) after the turn steering, in a state in which the driver has their hands on the steering wheel. A long broken line R0 indicates an operation in a case in which the steering angle θ does not return to 0 [deg] as a result of friction, when the return control is not performed or when the output of the return control is insufficient and the returning speed is too slow.

Conversely, a short broken line R1 indicates an operation in which the steering wheel returns to the neutral position as a result of favorable return control. Because the returning speed is appropriate, the steering angle θ changes smoothly.

In addition, a single-dot chain line R2 and a two-dot chain line R3 show examples of inappropriate return control. In an operation indicated by the single-dot chain line R2, the output of the return control is excessive and the returning speed is too fast. Consequently, steering is inhibited. In an operation indicated by the two-dot chain line R3, the returning speed is unstable. Consequently, the driver may experience discomfort. Therefore, in the return control, a control goal is to actualize the operation indicated by the short broken line R1 in which steering is not inhibited and the steering wheel returns at a natural speed that does not cause discomfort.

Figure 2B:
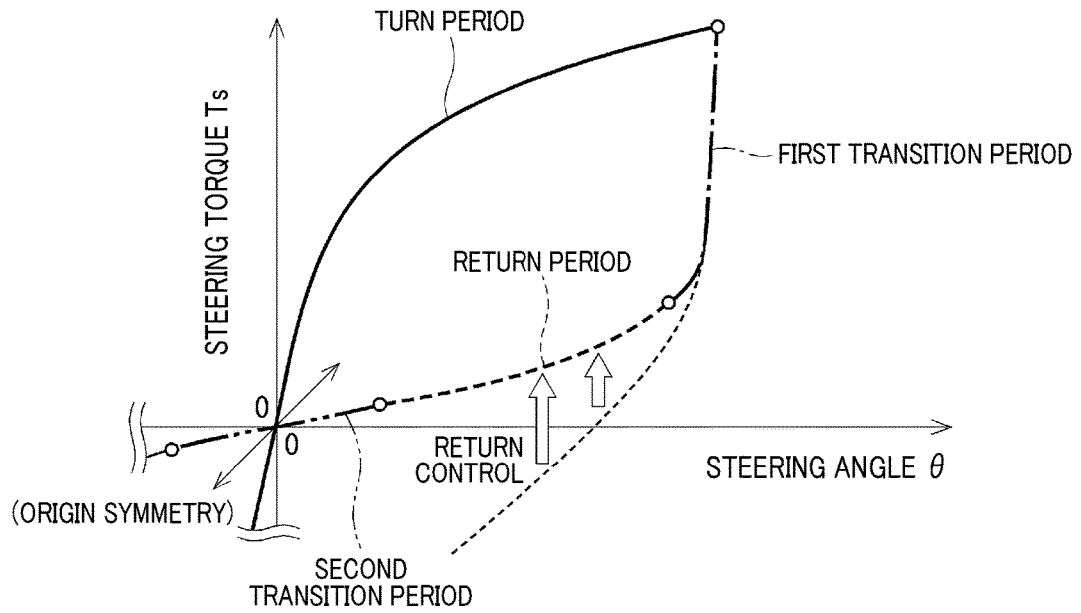
FIG. 2B is a diagram of changes in state during transition from turn steering to return steering, in return control.

FIG. 2B is a diagram that expresses changes in state during transition from the turn steering to the return steering, based on a relationship between the steering angle θ and the steering torque Ts. Here, positive and negative signs of the steering angle θ are defined based on leftward and rightward directions with reference to the neutral position. In addition, signs of the steering torque Ts are defined based on the same directions as the directions indicated by the signs of the steering angle θ. Basically, when the steering torque Ts is applied in a positive direction, the steering angle θ changes to a positive direction. When the steering torque Ts is applied in a negative direction, the steering angle θ changes to a negative direction. FIG. 2B shows a diagram in which the steering angle θ and the steering torque Ts are both in the positive region. A diagram in which the steering angle θ and the steering torque Ts are both in the negative region will appear to be symmetrical to the diagram in FIG. 2B with respect to the origin.

The changes in state during the transition of steering are divided into four periods, that is, a "turn period" indicated by a solid line, a "first transition period" indicated by a single-dot chain line, a "return period" indicated by a broken line, and a "second transition period" indicated by a two-dot chain line.

During the turn period in which the driver is turning the steering wheel, an absolute value of the steering angle θ increases. Curve shapes in FIG. 2B are merely an example. During the turn period, the return control is not performed so as not to inhibit steering.

When the driver starts to return the steering wheel to the neutral position, the steering angle θ hardly changes. An absolute value of the steering speed ω is relatively small. During this first transition period, when the return control is actively performed, the driver experiences a strong returning sensation. Therefore, the return control is gradually started.

During the return period in which the driver is returning the steering wheel to the neutral position, the absolute value of the steering angle θ decreases. During the return period, the return control is actively performed. As a result, a curve expressed by a thin broken line that indicates "when the return control is not performed" is corrected such that the tip of the curve faces the point of origin.

During the second transition period in which the steering wheel is near the neutral position, the absolute value of the steering angle θ gradually approaches zero over a relatively small range. The return control is gradually ended during this period.

In addition, respective steering states during the return period, the turn period, and the transition periods are referred to as a "returning state," a "turning state," and a "transitioning state." The returning state is defined as "a state in which the steering wheel position is changing towards the neutral position." The turning state is defined as "a state in which the steering wheel position is changing in the direction away from the neutral position."

Information quantitatively expressing the returning state is a "return state quantity α" that is calculated by a returning state determining unit 50, described hereafter. The return state quantity α during each period in FIG. 2B is "α=0" during the turn period, "α=1" during the return period, and "0<α<1" during the first and second transition periods.

JP-A-2015-145216 discloses a conventional technology in which a counter-return command value in the direction in which the steering wheel does not return to the neutral position is calculated based on an angular acceleration of a motor. The counter-return command value is added to an assistance command value, and the steering wheel is thereby able to smoothly return to the neutral position. However, in this conventional technology, the counter-return command value is calculated based on the angular acceleration of the motor, even during turning. As a result, a problem arises in that a torque in a direction that inhibits steering is outputted when the driver performs turn steering.

With regard to this problem, the return control unit 15 according to the present embodiment includes a "returning speed stabilization control unit" that calculates the returning speed stabilization torque Tω_stb. The returning speed stabilization torque Tω_stb stabilizes the returning speed when the steering wheel 91 is returning towards the neutral position. The returning speed stabilization control unit calculates the returning speed stabilization torque such that a steering angle acceleration a becomes closer to 0. The steering angle acceleration a is a second-order time differential value of steering wheel position-related information correlated with the steering wheel position, typically a second-order time differential value of the steering angle θ, and is a time differential value of the steering speed ω.

"The second-order time differential value of the steering wheel position-related information becomes closer to 0" refers to control performed such that acceleration of the rotation of the steering wheel is suppressed and the returning speed is fixed. From a sensory perspective, this control corresponds to artificially increasing inertia in the steering system mechanism 100.

Next, a configuration of the return control unit 15 will be described in detail.

[Configuration of the Return Control Unit]

Figure 3:
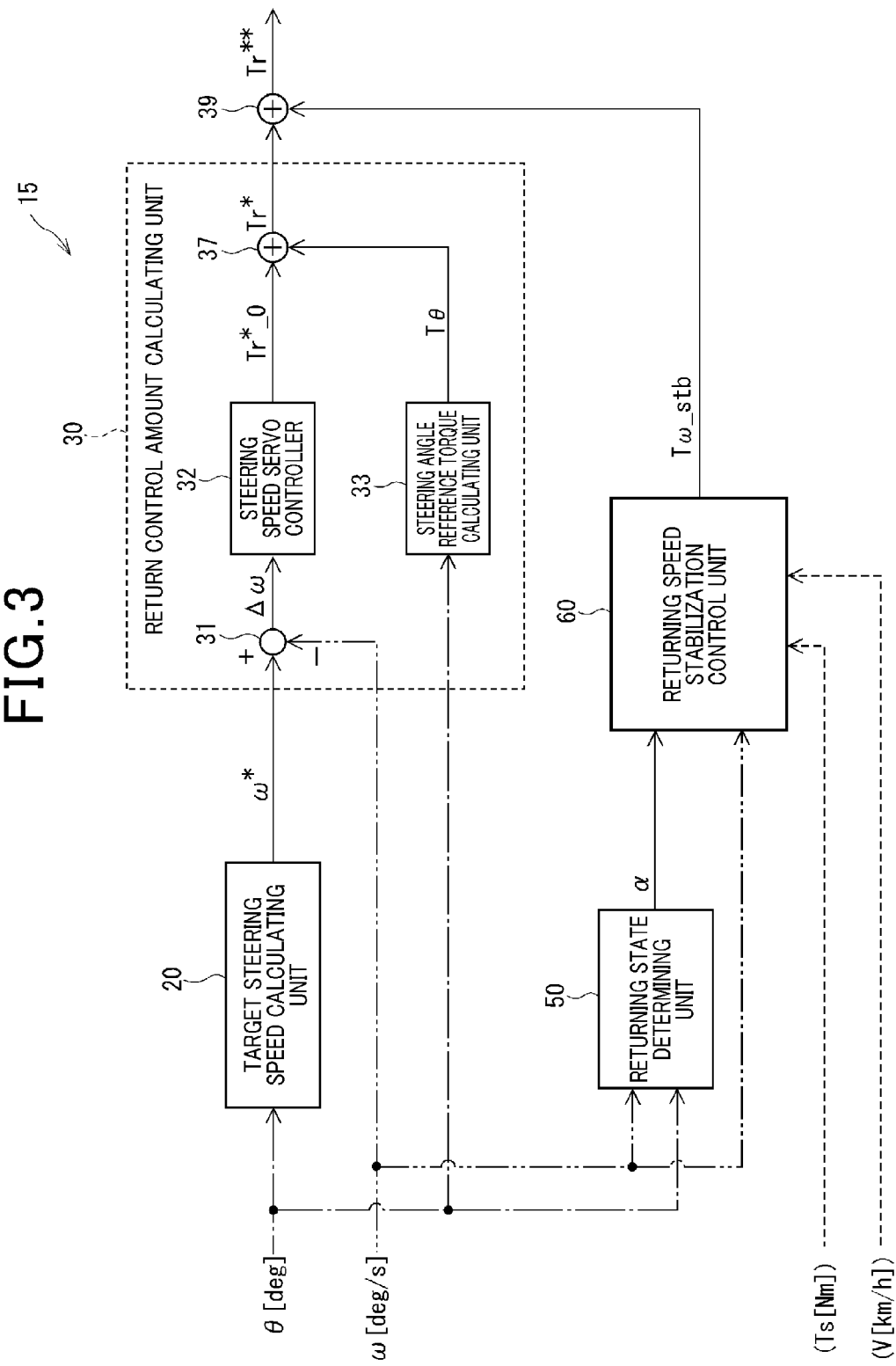
FIG. 3 is an overall control block diagram of a return control unit according to each embodiment.

An overall configuration of the return control unit 15 is shown in FIG. 3.

The return control unit 15 is largely configured by four blocks, that is, a target steering speed calculating unit 20, a return control amount calculating unit 30, a returning state determining unit 50, and a returning speed stabilization control unit 60. In simple terms, the functions of the four blocks are as follows: the target steering speed calculating unit 20 calculates a target steering speed ω* for when the steering wheel returns to the neutral position; the return control amount calculating unit 30 calculates a returning force command value for the returning force that returns the steering wheel to the neutral position; the returning state determining unit 50 determines whether the steering wheel is turning or returning; and the returning speed stabilization control unit 60 stabilizes the returning speed of the steering wheel.

According to each embodiment, the steering angle θ and the steering speed ω are inputted to the return control unit 15 as information quantities used for calculation in each block. In the overall configuration diagram in FIG. 3, input of the steering angle θ is indicated by a single-dot chain line and input of the steering speed is indicated by a two-dot chain line, taking into consideration visibility of the drawings. All calculation results outputted from these blocks are indicated by solid lines. In addition, according to the second embodiment, the vehicle speed V is further inputted to the returning speed stabilization control unit 60. According to the third embodiment, the steering torque Ts is inputted to the returning speed stabilization control unit 60. Input signals of the vehicle speed V and the steering torque Ts are indicated by broken lines in FIG. 3.

The target steering speed calculating unit 20 calculates the target steering speed ω* for when the steering wheel returns to the neutral position, based on the steering angle θ.

The return control amount calculating unit 30 includes a steering speed deviation calculating unit 31, a steering speed servo controller 32, a steering angle reference torque calculating unit 33, and an adder 37. The steering speed deviation calculating unit 31 calculates a deviation Δω between the target steering speed ω* and the steering speed ω. The steering speed servo controller 32 performs servo control such that the steering speed deviation Δω becomes 0, that is, the steering speed ω follows the target steering speed ω*. The steering speed servo controller 32 calculates a basic return control amount Tr*_0.

The steering angle reference torque calculating unit 33 calculates a steering reference torque Tθ that is the returning force based on the steering angle θ. The adder 37 adds the steering angle reference torque Tθ to the basic return control amount Tr*_0. The return control amount Tr* is thereby calculated. The return control amount calculating unit 30 outputs the return control amount Tr* calculated in this manner.

The configuration and workings of the returning state determining unit 50 will be described with reference to FIGS. 4 to 7.

The returning state determining unit 50 determines whether or not the steering state is the "returning state" based on the steering angle θ and the steering speed ω. Here, the steering angle θ corresponds to "steering wheel position-related information correlated with the steering wheel position." The value of the steering angle θ when the steering wheel is in the neutral position is 0. The value of the steering angle θ becomes positive or negative based on a rotation direction of the steering wheel from the neutral position. In addition, the steering speed ω corresponds to a "time rate of change of the steering wheel position-related information."

Figure 4:
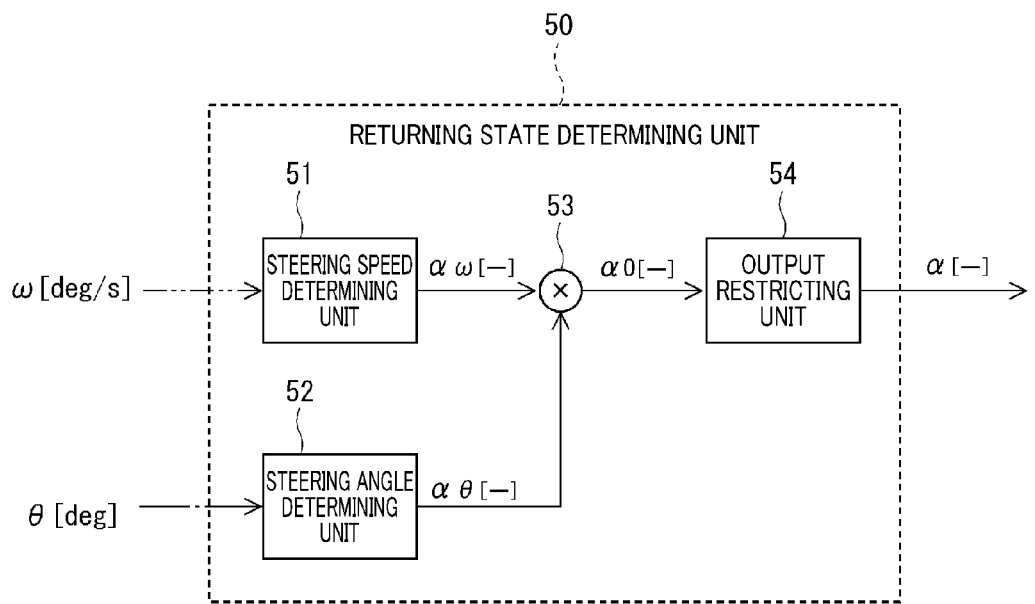
FIG. 4 is a control block diagram of a returning state determining unit.

As shown in FIG. 4, the returning state determining unit 50 includes a steering speed determining unit 51, a steering angle determining unit 52, a multiplier 53, and an output restricting unit 54. State quantities αω, αθ, α0, and α are each a dimensionless quantity [−].

Figure 5A:
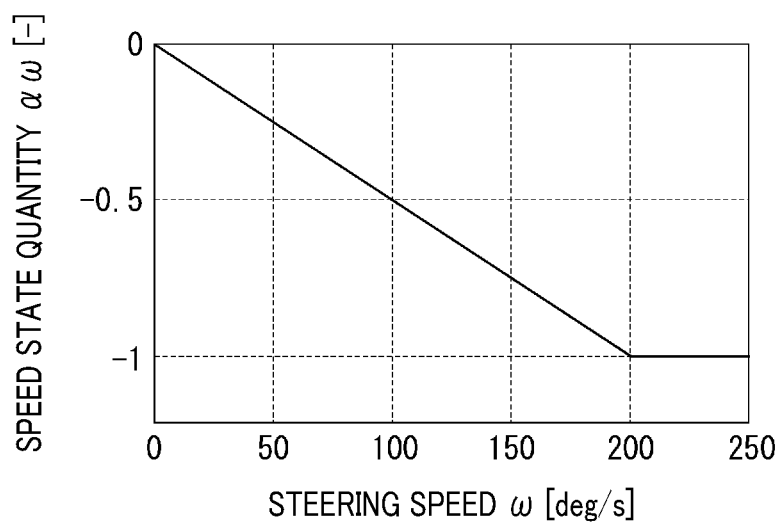
FIG. 5A is an example of a speed state quantity map.
Figure 5B:
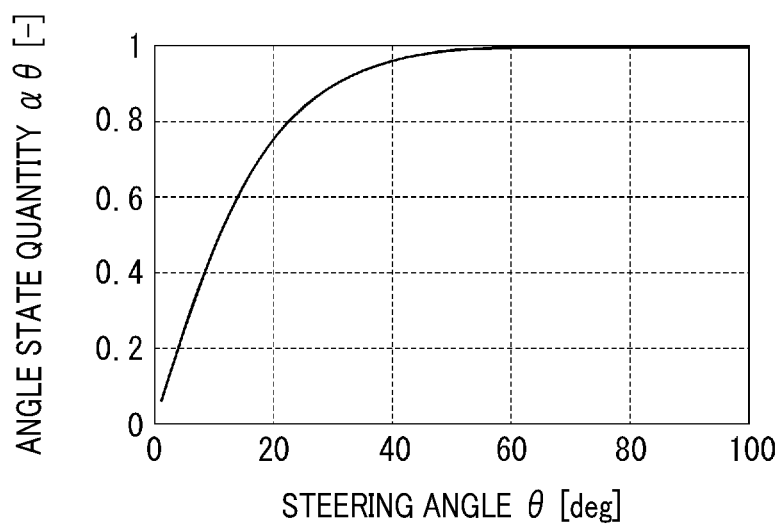
FIG. 5B is an example of an angle state quantity map of the returning state determining unit.

Maps in FIGS. 5A and 5B respectively show maps in which the steering speed ω and the steering angle θ are in the positive region. Maps in which the steering speed ω and the steering angle θ are in the negative region will appear to be symmetrical to the maps in FIGS. 5A and 5B with respect to the origin. Numeric values in the map are merely examples.

The steering speed determining unit 51 calculates a speed state quantity $\Delta\omega$ that is a value ranging from −1 to +1, based on the steering speed $\omega$. The speed state quantity $\Delta\omega$ indicates that the steering wheel is rotating at a higher speed as the absolute value of the speed state quantity $\Delta\omega$ increases. Positive/negative of the value indicates the rotation direction.

Specifically, as shown in FIG. 5A, the speed state quantity $\Delta\omega$ is 0 when the steering speed $\omega$ is 0 [deg/s]. When the steering speed $\omega$ is positive, the speed state quantity $\Delta\omega$ decreases from 0 to −1 as the steering speed $\omega$ increases. When the steering speed $\omega$ is negative, the speed state quantity $\Delta\omega$ increases from 0 to +1 as the steering speed $\omega$ decreases.

The steering angle determining unit 52 calculates an angle state quantity $\alpha\theta$ that is a value ranging from −1 to +1, based on the steering angle $\theta$. The angle state quantity $\alpha\theta$ indicates that the steering wheel s at a position farther from the neutral position as the absolute value of the angle state quantity $\alpha\theta$ increases. Positive/negative of the value indicates the direction.

Specifically, as shown in FIG. 5B, the angle state quantity $\alpha\theta$ is 0 when the steering angle $\theta$ is 0 [deg]. When the steering angle $\theta$ is positive, the angle state quantity $\alpha\theta$ increases from 0 to +1 as the steering angle $\theta$ increases, and converges at about +1 when the steering angle $\theta$ is near 60 [deg]. When the steering angle $\theta$ is negative, the angle state quantity $\alpha\theta$ decreases from 0 to −1 as the steering angle $\theta$ decreases, and converges at about −1 when the steering angle $\theta$ is near −60 [deg].

The multiplier 53 calculates a pre-restriction return state quantity $\alpha\theta$ that is a value ranging from −1 to +1. The pre-restriction return state quantity $\alpha\theta$ is a product of the speed state quantity $\Delta\omega$ and the angle state quantity $\alpha\theta$.

Figure 6:
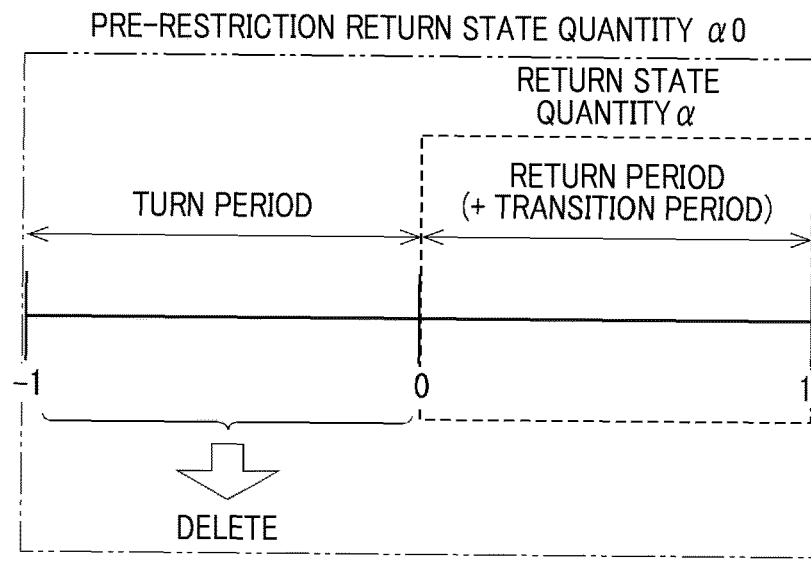
FIG. 6 is a diagram for explaining restriction of a return control amount by an output restricting unit.

As shown in FIG. 6, the output restricting unit 54 deletes "negative values ranging from −1 to 0" of the pre-restriction return state quantity $\alpha\theta$. The "negative values ranging from −1 to 0" correspond to values during the turn period and are unnecessary in calculations described hereafter. The output restricting unit 54 then outputs only "positive values ranging from 0 to +1" to the returning speed stabilization control unit 60, as the return state quantity $\alpha$. The "positive values ranging from 0 to +1." correspond to values during the return period or the transition period.

Figure 7:
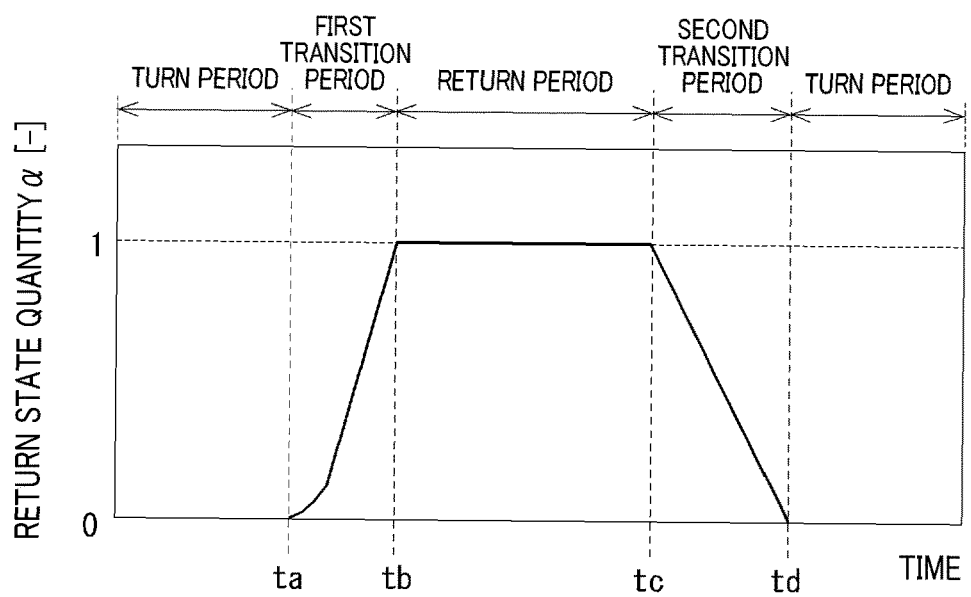
FIG. 7 is actual apparatus data indicating changes in a return quantity based on a steering state.

FIG. 7 shows actual apparatus data of the return state quantity $\alpha$ during turn steering at a low speed and from a large steering angle. During the turn periods before time ta and after time td, the return state quantity $\alpha$ is 0. During the first transition period from time ta to time tb, the return state quantity $\alpha$ increases from 0 to 1. During the return period from time tb to time tc, the return state quantity $\alpha$ is 1. During the second transition period from time tc to time td, the return state quantity $\alpha$ decreases from 1 to 0. As the actual apparatus data indicates, the steering state can be determined to be in the return period when 1 is outputted as the return state quantity $\alpha$.

As described above, according to the present embodiment, the sign of the pre-restriction return state quantity $\alpha\theta$ is determined based on the product of the angle state quantity $\alpha\theta$ and the speed state quantity $\alpha\omega$. That is, when the signs of the steering angle $\theta$ and the steering speed $\omega$ differ, the pre-restriction return state quantity $\alpha\theta$ is positive. A determination is made that the steering state is the returning state or the transitioning state. That is, the steering state switches between the returning state or the transitioning state, and the turning state at the neutral position at which the steering angle $\theta$ is 0.

When a determination is made based on the product of the signs of the steering torque Ts and the steering speed $\omega$, the sign of "Ts×$\omega$" becomes positive during the period in which the steering angle $\theta$ is increasing, regardless of whether the steering angle $\theta$ is positive or negative, when the steering torque Ts in the positive direction is being applied. Meanwhile, the sign of "Ts×$\omega$" becomes positive during the period in which the steering angle $\theta$ is decreasing, regardless of whether the steering angle $\theta$ is positive or negative, when the steering torque Ts in the negative direction is being applied. That is, "Ts×$\omega$" does not switch between positive and negative at the neutral position at which the steering angle $\theta$ is 0. Therefore, according to the present embodiment, the determination regarding the returning state is not made based on the steering torque Ts and the steering speed $\omega$.

The returning speed stabilization control unit 60 calculates the returning speed stabilization torque T$\omega$_stb based on at least the return state quantity $\alpha$ and the steering speed $\omega$. A multiplier 39 multiplies the returning speed stabilization torque T$\omega$_stb with the return control amount Tr* outputted by the return control amount calculating unit 30. The return control amount final command value Tr** is thereby calculated.

Next, configurations of the returning speed stabilization control unit 60 according to the first to third embodiments will be described in this order. As the reference number of the returning speed stabilization control unit according to each embodiment, the number of the embodiment is added as a third digit that follows the number "60".

[Configuration of the Returning Speed Stabilization Control Unit]

First Embodiment

Figure 8:
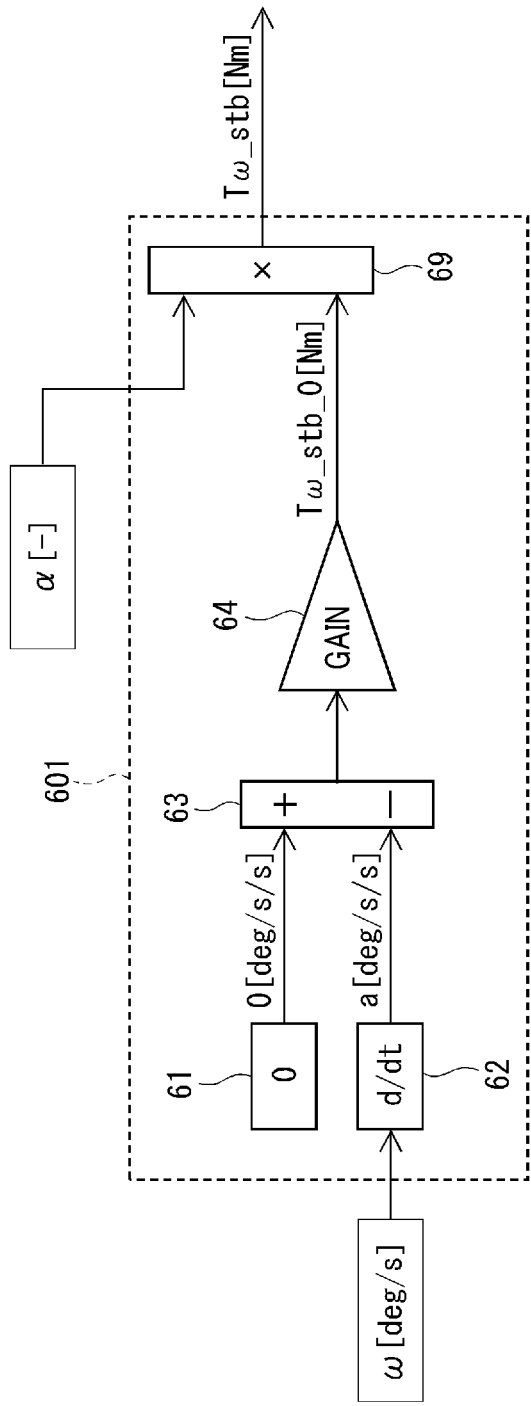
FIG. 8 is a control block diagram of a returning speed stabilization control unit according to a first embodiment.

FIG. 8 shows a configuration of a returning speed stabilization control unit 601 according to the first embodiment. The returning speed stabilization control unit 601 includes a target steering angle acceleration input unit 61, a differentiator 62, a comparator 63, a stabilization torque controller 64, and a return state quantity multiplier 69.

The target steering angle acceleration input unit 61 inputs 0 [deg/s/s] to a non-inverting input terminal (+) of the comparator 63, as a target value for steering angle acceleration. Here, 0 [deg/s/s] is a value of when the steering speed $\omega$ is fixed. The differentiator 62 performs time differentiation on the inputted steering speed $\omega$, and inputs an actual steering angle acceleration to a [deg/s/s] to an inverting input terminal (−) of the comparator 63.

The comparator 63 calculates a deviation between the target steering angle acceleration (that is, 0) and the actual steering angle acceleration a. The stabilization torque controller 64 calculates a returning speed stabilization torque basic value T$\omega$_stb_0 such that the steering angle acceleration deviation follows 0 and the returning speed is stabilized.

For example, when the returning speed in the positive direction is accelerating, the actual steering angle acceleration a is positive and the deviation is negative. At this time, the returning speed stabilization torque basic value T$\omega$_stb_0 in the negative direction is calculated. In addition, when the returning speed in the negative direction is accelerating, the actual steering angle acceleration a is negative and the deviation is positive. At this time, the returning speed stabilization torque basic value T$\omega$_stb_0 in the positive direction is calculated. This similarly applies when the returning speed is decelerating.

The return state quantity multiplier 69 multiplies the return state quantity α with the returning speed stabilization torque basic value Tω_stb_0 and outputs the returning speed stabilization torque Tω_stb. That is, the returning speed stabilization control unit 601 changes the returning speed stabilization torque Tω_stb based on the return state quantity α such that the absolute value of the returning speed stabilization torque Tω_stb in the returning state is relatively greater than that in the turning state.

As a result, during the return period in which the return state quantity α is 1 and the transition periods in which the return state quantity α is greater than 0 and less than 1, the returning speed stabilization torque Tω_stb is outputted. Control is performed such that the steering angle acceleration becomes 0, that is, the returning speed becomes fixed. Meanwhile, during the turn period in which the return state quantity α is 0, the returning speed stabilization torque Tω_stb is not outputted. As a result, during turn steering, acceleration of the rotation of the steering wheel as intended by the driver is permitted. Therefore, steering is not inhibited.

Next, actual apparatus data obtained when the returning speed stabilization control according to the first embodiment is performed will be described with reference to FIGS. 9A to 9C and 10A to 10C. A horizontal axis in each of FIGS. 9A to 9C and 10A to 10C indicates a common time axis. Vertical axes in FIGS. 9A and 10A indicate the steering angle θ. Vertical axes in FIGS. 9B and 10B indicate the steering speed ω. Vertical axes in FIGS. 9C and 10C indicate the returning speed stabilization torque Tω_stb.

Figure 9A:
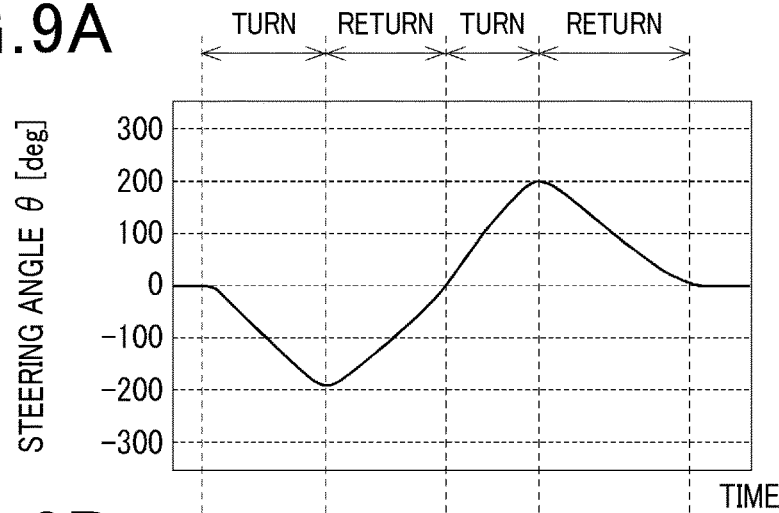
FIGS. 9A to 9C are actual apparatus data (1) indicating working effects of returning speed stabilization control.
Figure 9B:
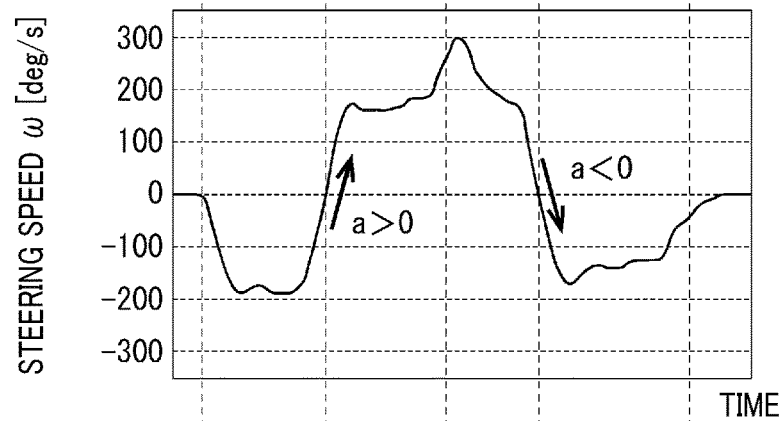
Figure 9C:
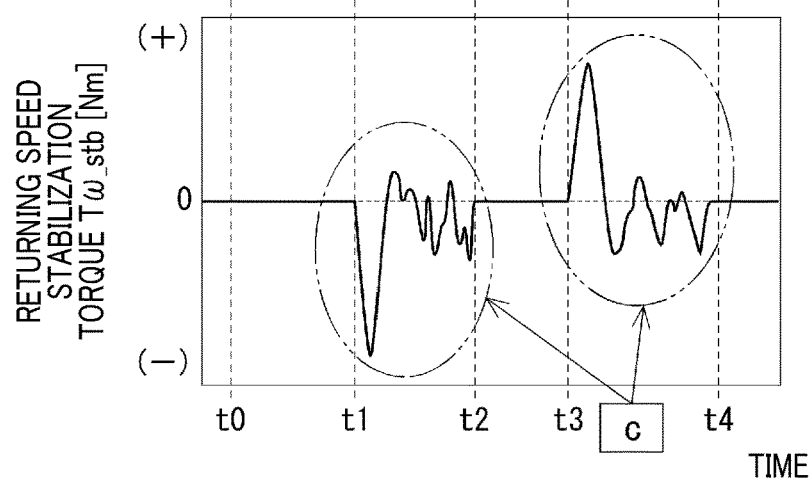

As shown in FIG. 9A, the actual apparatus data in FIGS. 9A to 9C is data obtained when the steering wheel is steered to the neutral position after being steered from about −180 [deg] to about +180 [deg]. Specifically, turn steering in the negative direction at the steering angle θ is performed from time t0 to time t1. Return steering is performed from time t1 to time t2. Turn steering in the positive direction at the steering angle θ is performed from time t2 to time t3. Return steering is performed from time t3 to time t4.

As shown in FIG. 9B, the steering speed ω crosses 0 at time t1 and time t3 when the steering transitions from the turn steering to the return steering.

During a period crossing time t1, the steering speed ω increases and the positive steering angle acceleration a is generated. However, before time t1, the product of the positive speed state quantity Δω and the negative angle state quantity αθ is negative. The return state quantity α is 0. Therefore, the returning speed stabilization torque Tω_stb is not outputted. When the steering speed ω transitions from negative to positive at time t1, the return state quantity α becomes greater than 0. As indicated in section c in FIG. 9C, the negative returning speed stabilization torque Tω_stb is outputted.

During a period crossing time t3, the steering speed ω decreases and the negative steering angle acceleration a is generated. However, before time t3, the product of the negative speed state quantity Δω and the positive angle state quantity αθ is negative. The return state quantity α is 0. Therefore, the returning speed stabilization torque Tω_stb is not outputted. When the steering speed ω transitions from positive to negative at time t3, the return state quantity α becomes greater than 0. The positive returning speed stabilization torque Tω_stb is outputted.

As described above, during return steering, the returning speed stabilization torque Tω_stb is outputted in the direction opposite the direction of the steering angle acceleration a. As a result, acceleration of the rotation of the steering wheel is suppressed. Consequently, a sensation similar to that of increase in the inertia in the steering system mechanism 100 is produced. Returning speed is stabilized.

In addition, the returning speed stabilization torque Tω_stb is outputted only during the return period and the transition period, and is not outputted during turn steering. As a result, during turn steering, acceleration of the rotation of the steering wheel is permitted as intended by the driver. Steering by the driver is not inhibited.

Figure 10A:
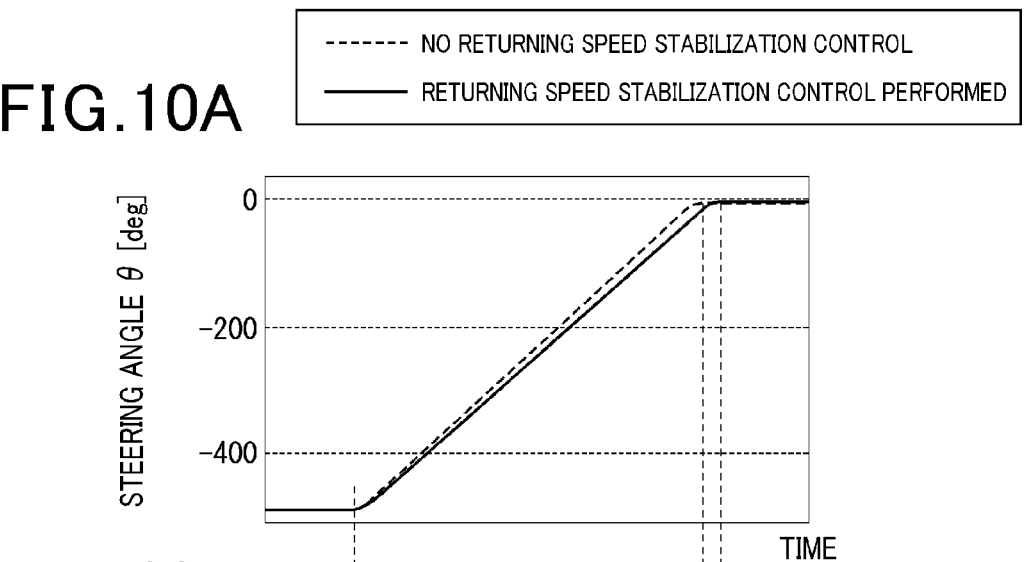
FIGS. 10A to 10C are actual apparatus data (2) indicating working effects of returning speed stabilization control.
Figure 10B:
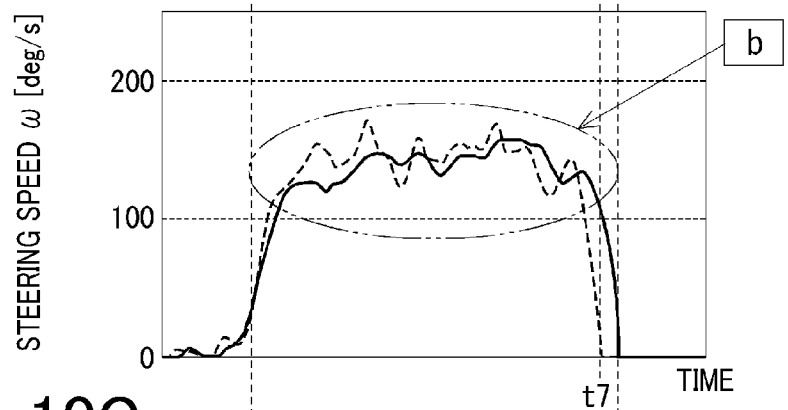
Figure 10C:
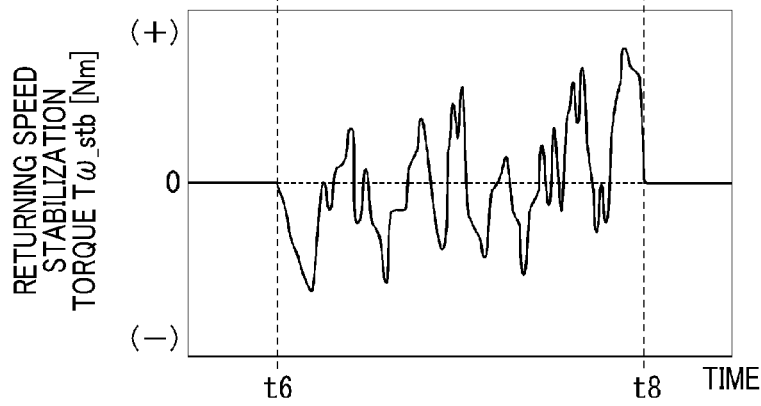

As shown in FIG. 10A, the actual apparatus data in FIGS. 10A to 10C is data obtained when the driver steers the steering wheel to about −480 [deg] and lets go of the steering wheel. In FIGS. 10A and 10B, changes in the steering angle θ and the steering speed ω when the returning speed stabilization control is not performed are indicated by broken lines for comparison.

The driver lets go of the steering wheel at time t6, both in the case in which the returning speed stabilization control is performed and in the case in which the returning speed stabilization control is not performed. The return operation is completed at time t7 in the case in which the returning speed stabilization control is not performed. The return operating is completed at time t8, at a slight delay from time t7, in the case in which the returning speed stabilization control is performed.

In the case in which the returning speed stabilization control is performed, when the steering speed ω starts to fluctuate, the returning speed stabilization torque Tω_stb is outputted to suppress the fluctuations. Therefore, as indicated in section b in FIG. 10B, the changes in the steering speed ω become smaller compared to that in the case in which the returning speed stabilization control is not performed. A stable return operation of the steering wheel can be actualized. Therefore, steering feel can be improved.

Next, configurations of the returning speed stabilization control unit according to the second and third embodiments will be described. Configurations that are essentially identical to those according to the first embodiment are given the same reference numbers. Descriptions thereof are omitted.

Second Embodiment

Figure 11:
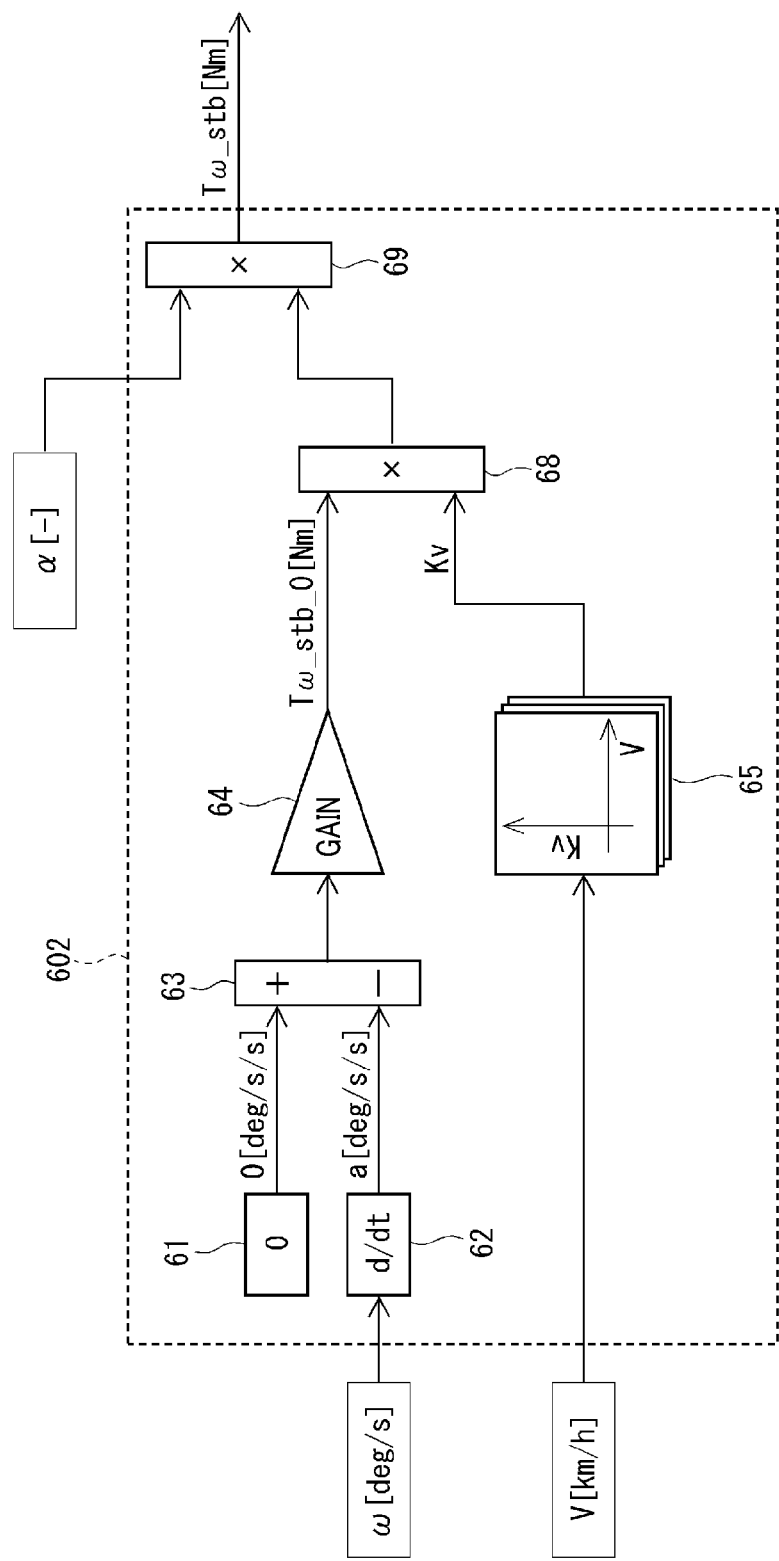
FIG. 11 is a control block diagram of a returning speed stabilization control unit according to a second embodiment.

A returning speed stabilization control unit 602 according to the second embodiment will be described with reference to FIGS. 11 and 12. As shown in FIG. 11, the returning speed stabilization control unit 602 according to the second embodiment further includes a vehicle-speed gain map 65 and a gain multiplier 68 in addition to the configuration of the returning speed stabilization control unit 601 according to the first embodiment.

The vehicle-speed gain map 65 prescribes a relationship between the vehicle speed V and a vehicle-speed gain Kv. The gain multiplier 68 multiplies the vehicle speed gain Kv with the returning speed stabilization torque basic value Tω_stb_0 calculated by the stabilization torque controller 64. The product is then outputted to the return state quantity multiplier 69.

Figure 12:
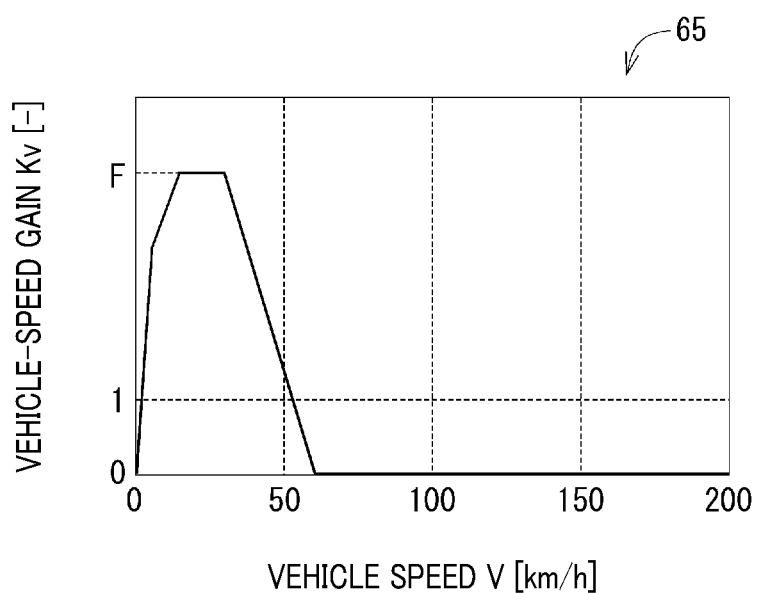
FIG. 12 is an example of a vehicle-speed gain map in FIG. 11.

Based on an example of the vehicle-speed gain map 65 shown in FIG. 12, in a low-speed region of about 30 km/h or lower, the vehicle-speed gain Kv is a maximum value F that is greater than 1. In a mid-speed region from about 30 km/h to about 60 km/h, the vehicle-speed gain Kv gradually decreases from the maximum value F to 0 as the vehicle speed V increases. In a high-speed region of about 60 km/h or higher, the vehicle-speed gain Kv becomes 0.

Therefore, in the low-speed region, the returning speed stabilization torque basic value Tω_stb is amplified. In the high-speed region, the returning speed stabilization torque basic value Tω_stb is no longer outputted. As described above, according to the second embodiment, the returning speed stabilization torque basic value Tω_stb is calculated based on the vehicle speed V. As a result, steering feel can be improved.

Third Embodiment

Figure 13:
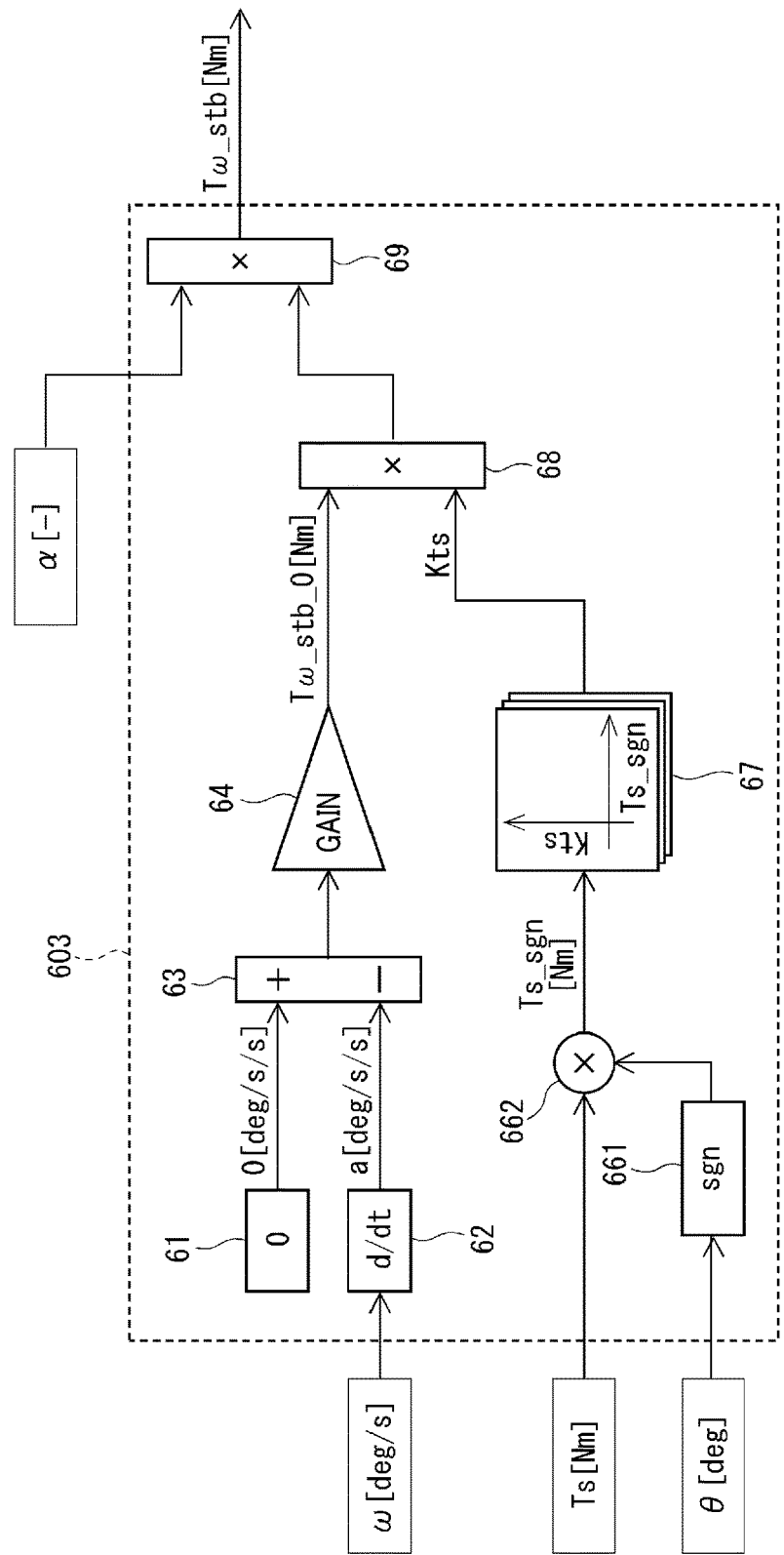
FIG. 13 is a control block diagram of a returning speed stabilization control unit according to a third embodiment.

A returning speed stabilization control unit 603 according to the third embodiment will be described with reference to FIGS. 13 to 15. As shown in FIG. 13, the returning speed stabilization control unit 603 according to the third embodiment further includes a sign determining unit ("sign" in the drawing) 661, a sign multiplier 662, a correction gain map 67, and a gain multiplier 68, in addition to the configuration of the returning speed stabilization control unit 601 according to the first embodiment.

The sign determining unit 661 determines the sign of the steering angle $\theta$. The sign determining unit 661 calculates "+1" when the steering angle $\theta$ is positive and calculates "−1" when the steering angle $\theta$ is negative. When the steering angle $\theta$ is 0, the value may be an arbitrary value ranging from −1 to +1. The sign multiplier 662 multiplies the sign of the steering angle $\theta$ with the steering torque Ts. A post-sign multiplication steering torque Ts_sgn is thereby calculated.

The correction gain map 67 prescribes a relationship between the post-sign multiplication steering torque Ts_sgn and a correction gain Kts. The gain multiplier 68 multiplies the correction gain Kts with the returning speed stabilization torque basic value Tω_stb_0 calculated by the stabilization torque controller 64. The product is then outputted to the return state quantity multiplier 69.

Here, definitions of the signs of the steering angle $\theta$ and the steering torque Ts will be described with reference to FIG. 14.

Figure 14:
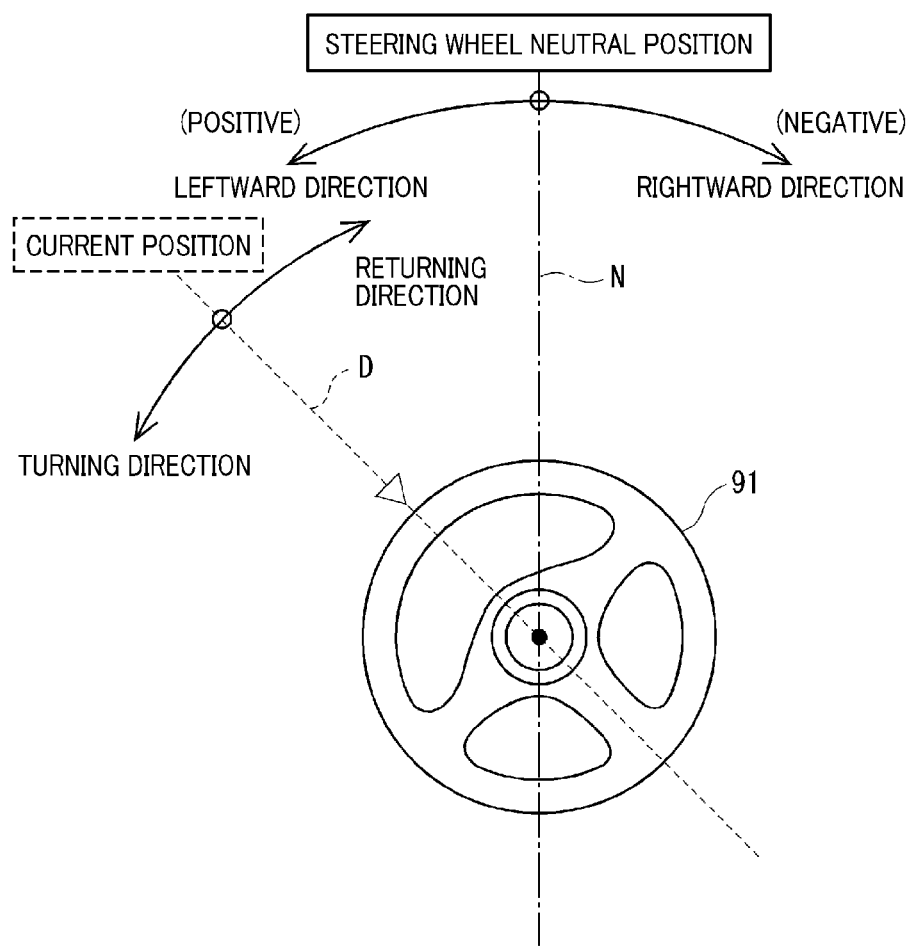
FIG. 14 is a diagram for explaining definitions of signs for steering angle and steering torque.

A direction of a single-dot chain line N in FIG. 14 indicates the neutral position of the steering wheel 91 (hereafter, the reference number 91 is omitted). A direction of a broken line D indicates a current steering wheel position. Regarding the steering angle $\theta$, the steering angle $\theta$ on the left side in relation to the neutral position is defined as being positive, and the steering angle $\theta$ on the right side in relation to the neutral position is defined as being negative. In addition, the steering speed ω and the steering torque Ts in a leftward rotation direction, that is, the counterclockwise direction are defined as being positive. The steering speed ω and the steering torque Ts in a rightward rotation direction, that is, the clockwise direction are defined as being negative.

According to another embodiment, conversely to the foregoing, the steering angle $\theta$ on the right side in relation to the neutral position, and the steering speed ω and the steering torque Ts in the rightward rotation direction may be defined as being positive. The steering angle $\theta$ on the left side in relation to the neutral position, and the steering speed ω and the steering torque Ts in the leftward rotation direction may be defined as being negative.

In addition, regarding the steering torque Ts, the direction merely indicates the direction in which the torque is applied, regardless of whether or not the steering wheel is actually rotating in this direction. For example, cases in which the steering wheel is stopped even when the steering torque Ts is being applied, such as due to road surface load or inertial torque, and cases in which the steering wheel is rotating in the direction opposite the steering torque Ts can be considered.

Furthermore, as described above, the direction in which the steering wheel moves towards the neutral position is defined as the "returning direction." The direction in which the steering wheel moves away from the neutral position is defined as the "turning direction."

For example, when the steering angle $\theta$ is in the positive region, the torque is applied in the returning direction when the steering torque Ts is negative. The torque is applied in the turning direction when the steering torque Ts is positive. Meanwhile, when the steering angle $\theta$ is in the negative region, the torque is applied in the returning direction when the steering torque Ts is positive. The torque is applied in the turning direction when the steering torque Ts is negative.

In other words, the steering angle $\theta$ and the steering torque Ts having differing signs, and the post-sign multiplication steering torque Ts_sgn being negative indicates that the torque is being applied in the returning direction. The steering angle $\theta$ and the steering torque Ts having the same sign, and the post-sign multiplication steering torque Ts_sgn being positive indicates that the torque is being applied in the turning direction. Therefore, the post-sign multiplication steering torque Ts_sgn expresses both information on the absolute value of the steering torque Ts and information regarding whether the steering torque Ts is applied in the returning direction or the turning direction.

According to another embodiment, the signs of the steering torque Ts may be defined based on directions opposite the directions indicated by the signs of the steering angle $\theta$. The post-sign multiplication steering torque Ts_sgn may be calculated based on this definition. In this case, the post-sign multiplication steering torque Ts_sgn being positive indicates that the torque is being applied in the returning direction. The post-sign multiplication steering torque Ts_sgn being negative indicates that the torque is being applied in the turning direction.

Figure 15:
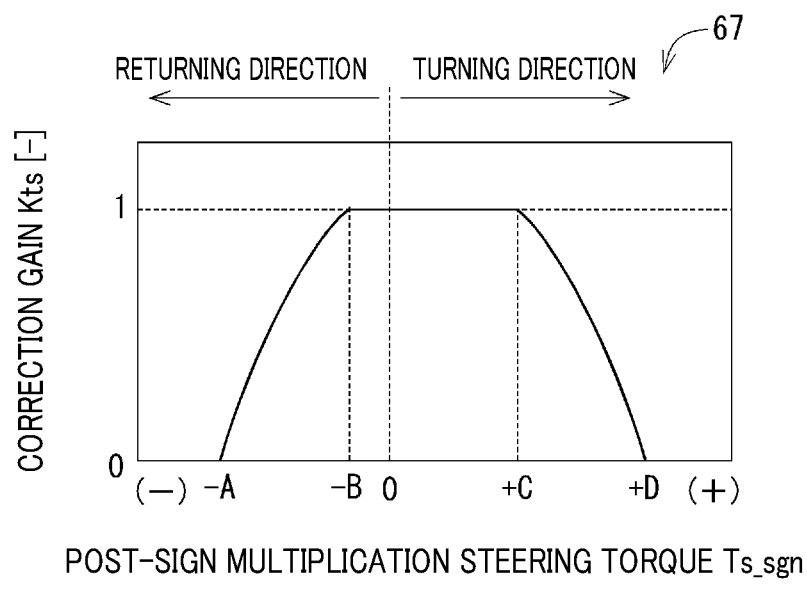
FIG. 15 is an example of a correction gain map in FIG. 13.

FIG. 15 shows an example of the correction gain map 67. During a period from "−B" to "+C" in which the post-sign multiplication steering torque Ts_sgn crosses 0, the correction gain Kts is 1. When the post-sign multiplication steering torque Ts_sgn is negative, during a period from "−A" and below, the correction gain Kts is 0. During a period from "−A" to "−B," the correction gain Kts gradually increases from 0 to 1 as the post-sign multiplication steering torque Ts_sgn increases. When the post-sign multiplication steering torque Ts_sgn is negative, during a period from "+C" to "+D," the correction gain Kts gradually decreases from 1 to 0 as the post-sign multiplication steering torque Ts_sgn increases. During a period from "+D" and above, the correction gain Kts is 0.

Therefore, in both the turning direction and the returning direction, in a region in which the absolute value of the steering torque Ts is relatively small, the returning speed stabilization torque basic value Tω_stb_0 is maintained. In a region in which the absolute value of the steering torque Ts is intermediate, the returning speed stabilization torque basic value Tω_stb_0 is attenuated. In addition, in a region in which the absolute value of the steering torque Ts is relatively large, the returning speed stabilization torque Tω_stb is no longer outputted. As described above, according to the third embodiment, the returning speed stabilization torque Tω_stb is calculated based on the post-sign multiplication steering torque Ts_sgn. As a result, steering feel can be improved. In addition, the third embodiment may be combined with the second embodiment.

Other Embodiments (1) The correction torque calculating unit 15 according to the above-described embodiments further actualizes stabilization of the returning speed by the returning speed stabilization control unit 60, on the basis of "return control" being performed by the return control amount calculating unit 30. The return control is control performed to appropriately return the steering wheel to the neutral position. However, the steering control apparatus of the present disclosure may include only the function for stabilizing the returning speed by the returning speed stabilization control unit 60. In this case, the operation of the steering wheel to be subjected to the returning speed stabilization control is not necessarily required to be that which ultimately reaches the neutral position.

(2) According to the above-described embodiments, the steering angle θ and the steering speed ω are used as the "steering wheel position-related information correlated with the steering wheel position" and the "time rate of change of the steering wheel position-related information" in the calculation of the return state quantity α by the returning state determining unit 50. In addition, according to the third embodiment, the steering angle θ is used as the "steering wheel position-related information" in the calculation of the post-sign multiplication steering torque Ts_sgn.

According to another embodiment, steering wheel position-related information such as a motor rotation angle, a rotation angle of a transmission system gear, a steering angle of a tire, or a yaw rate may be used instead of the steering angle θ. The time rate of change of such steering wheel position-related information may be used instead of the steering speed ω.

Furthermore, in the returning speed stabilization control unit 601 to 603, a "second-order time differential value of the steering wheel position-related information" may be used instead of the steering angle acceleration a.

(3) The returning speed stabilization control unit 601 to 603 according to the above-described embodiments multiply the returning speed stabilization torque basic value Tω_stb_0 calculated based on the steering angle acceleration deviation with the return state quantity α, and output the returning speed stabilization torque Tω_stb. Because the return state quantity α in the turning state is 0, the returning speed stabilization torque Tω_stb in the turning state is set to 0.

According to another embodiment, the returning speed stabilization torque Tω_stb in the turning state may be set to a value other than 0 as a result of the method for calculating the returning speed stabilization torque Tω_stb being changed or a numeric value in the calculation being adjusted. As long as calculation is at least performed such that the absolute value of the returning speed stabilization torque Tω_stb in the returning state is relatively greater than the absolute value of the returning speed stabilization torque Tω_stb in the turning state, working effects similar to those according to the above-described embodiments are achieved.

(4) According to the above-described embodiments, the maps are used for calculation of the speed state quantity αω and the angle state quantity αθ in the returning state determining unit 50, and calculation of the vehicle-speed gain Kv and the correction gain Kts in the returning speed stabilization control units 602 and 603. However, calculation of the state quantities and the correction amounts is not limited to the method in which a map is used. The state quantities and the correction amounts may be calculated by mathematical formulas.

The present disclosure is not limited in any way by the above-described embodiments. Various embodiments are possible without departing from the spirit of the present disclosure.

What is claimed is:

1. A steering control apparatus that controls an assistance torque outputted by a steering assistance motor based on a steering torque applied by a driver, the steering control apparatus comprising:
a basic assistance torque calculating unit that calculates a basic assistance torque; and
a correction torque calculating unit that calculates a correction torque to be added to the basic assistance torque, wherein
the correction torque calculating unit includes
a returning state determining unit that determines whether a steering wheel is turning or returning, and
a returning speed stabilization control unit that calculates a returning speed stabilization torque to stabilize a returning speed of the steering wheel, as the correction torque, and
the returning speed stabilization control unit calculates the returning speed stabilization torque such as to bring a second-order time differential value of steering wheel position-related information correlated with a steering wheel position closer to zero, and such that an absolute value of the returning speed stabilization torque based on the steering wheel returning is relatively greater than that based on the steering wheel turning.

2. The steering control apparatus according to claim 1, wherein:
the returning state determining unit determines whether the steering wheel is in a turning state in which the steering wheel position is changing in a direction away from a neutral position or a returning state in which the steering wheel position is changing in a direction towards the neutral position.

3. The steering control apparatus according to claim 2, wherein:
the returning state determining unit determines the returning state based on a return state quantity calculated from the steering wheel position-related information correlated with the steering wheel position and a time rate of change of the steering wheel position-related information; and
the returning speed stabilization control unit changes the returning speed stabilization torque based on the return state quantity.

4. The steering control apparatus according to claim 3, wherein:
the steering wheel position-related information is a steering angle;
the time rate of change of the steering wheel position-related information is a steering speed; and
the returning state determining unit calculates the return state quantity based on a product of an angle state quantity determined based on the steering angle and a speed state quantity determined based on the steering angle.

5. The steering control apparatus according to claim 4, wherein:
the returning speed stabilization control unit sets the returning speed stabilization torque to zero in response to the steering wheel turning.

6. The steering control apparatus according to claim 5, wherein:
the correction torque calculating unit further includes
a return control amount calculating unit that calculates a return control amount to assist in returning the steering wheel to the neutral position, as the correction torque.

7. The steering control apparatus according to claim 6, wherein
the correction torque calculating unit calculates the return control amount based on at least either of the steering angle and the steering speed.

8. The steering control apparatus according to claim 1, wherein:
the returning speed stabilization control unit sets the returning speed stabilization torque to zero in response to the steering wheel turning.

9. The steering control apparatus according to claim 2, wherein:
the returning speed stabilization control unit sets the returning speed stabilization torque to zero in response to the steering wheel turning.

10. The steering control apparatus according to claim 3, wherein:
the returning speed stabilization control unit sets the returning speed stabilization torque to zero in response to the steering wheel turning.

11. The steering control apparatus according to claim 1, wherein:
the correction torque calculating unit further includes
a return control amount calculating unit that calculates a return control amount to assist in returning the steering wheel to the neutral position, as the correction torque.

12. The steering control apparatus according to claim 2, wherein:
the correction torque calculating unit further includes
a return control amount calculating unit that calculates a return control amount to assist in returning the steering wheel to the neutral position, as the correction torque.

13. The steering control apparatus according to claim 3, wherein:
the correction torque calculating unit further includes
a return control amount calculating unit that calculates a return control amount to assist in returning the steering wheel to the neutral position, as the correction torque.

14. The steering control apparatus according to claim 4, wherein:
the correction torque calculating unit further includes
a return control amount calculating unit that calculates a return control amount to assist in returning the steering wheel to the neutral position, as the correction torque.

15. The steering control apparatus according to claim 1, wherein
the correction torque calculating unit calculates the return control amount based on at least either of the steering angle and the steering speed.

16. The steering control apparatus according to claim 2, wherein
the correction torque calculating unit calculates the return control amount based on at least either of the steering angle and the steering speed.

17. The steering control apparatus according to claim 3, wherein
the correction torque calculating unit calculates the return control amount based on at least either of the steering angle and the steering speed.

18. The steering control apparatus according to claim 4, wherein
the correction torque calculating unit calculates the return control amount based on at least either of the steering angle and the steering speed.

19. The steering control apparatus according to claim 5, wherein
the correction torque calculating unit calculates the return control amount based on at least either of the steering angle and the steering speed.

* * * * *